UNITED STATES PATENT OFFICE.

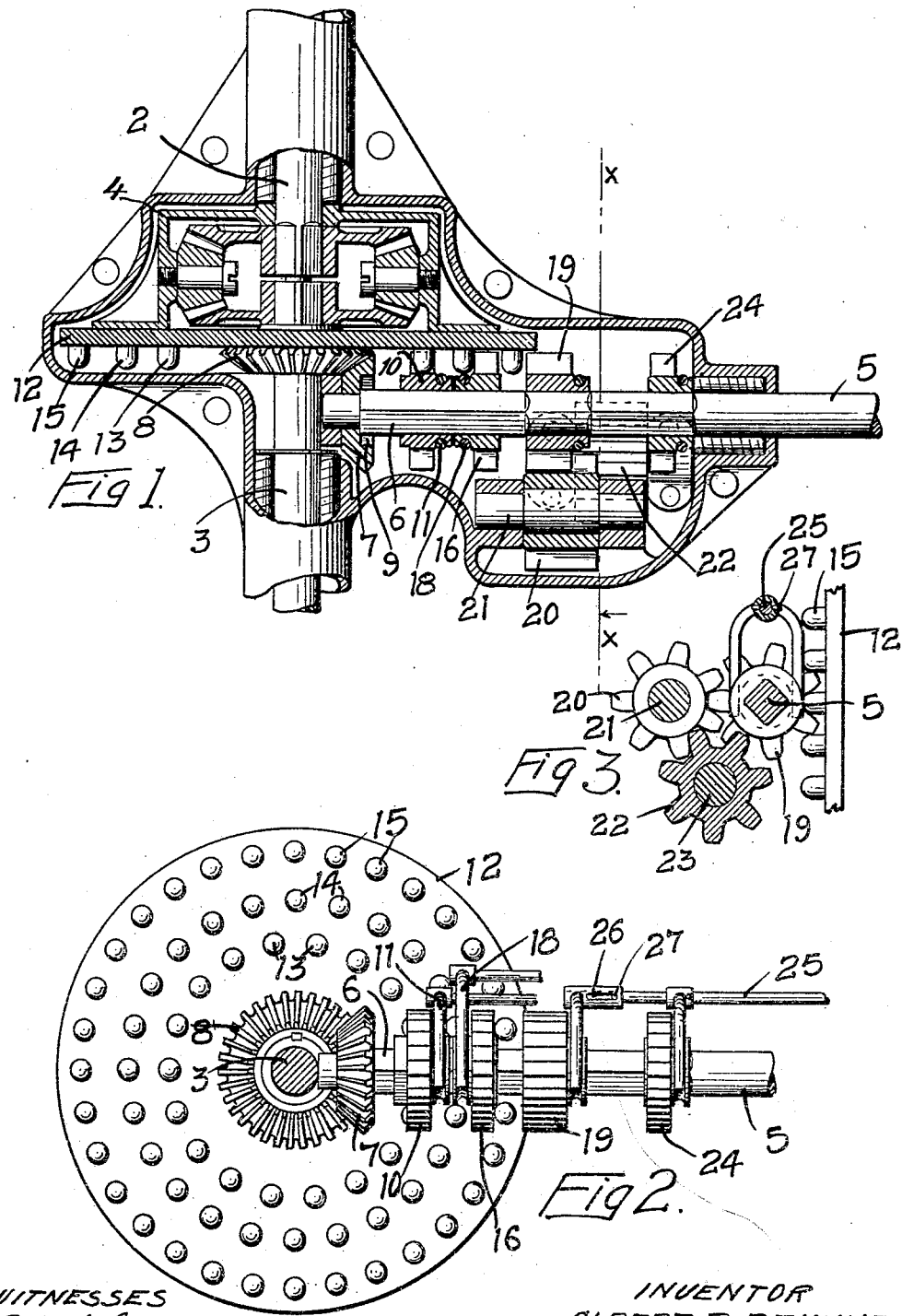

ALBERT R. BEHNKE, OF ST. PAUL, MINNESOTA.

TRANSMISSION-GEARING.

941,056. Specification of Letters Patent. Patented Nov. 23, 1909.

Application filed April 9, 1909. Serial No. 488,793.

*To all whom it may concern:*

Be it known that I, ALBERT R. BEHNKE, of St. Paul, Ramsey county, Minnesota, have invented certain new and useful Improvements in Transmission-Gearing, of which the following is a specification.

The object of my invention is to do away with the bevel gear usually employed with a differential case and provide means whereby different speeds may be obtained through a simple, compact transmission mechanism.

A further object is to provide a mechanism, by means of which a reversal can be easily and quickly obtained.

In the accompanying drawings, forming part of this specification, Figure 1 is a detail view, partially in section, illustrating the application of my invention to a transmission gearing. Fig. 2 is a detail view, illustrating the driving connection between the differential mechanism and the drive shaft. Fig. 3 is a sectional view on the line X—X of Fig. 1.

In the drawing, 2 represents one section of an axle and 3 the other section, between which is the usual differential mechanism 4, which is of ordinary construction and does not require detailed illustration herein.

5 is a drive shaft having a part 6 rectangular in cross section and carrying an idle bevel gear 7, which meshes with a similar gear 8 that is secured on the differential casing. The gear 7 has a rectangular socket 9 therein to receive the rectangular end of the sliding pinion 10, which is mounted on the part 6 of the shaft 5 and is adapted to slide thereon and temporarily lock the gear 7 when it is desired to transmit power directly through the gears 7 and 8 to the axle. These gears comprise the high speed driving connection of the mechanism. The operating mechanism 11 is connected with a pinion 10, by means of which it is moved back and forth on the shaft 5 to lock the gear 7 or release it. On the differential case, I secure a disk 12 and in the face of said disk, I arrange pins 13, 14 and 15 in concentric circles suitably spaced apart, the pins of the inner circle being adapted to mesh with the teeth of the pinion 10 for the purpose of transmitting power from the drive shaft to the differential. This inner circle of pins with the drive shaft pinion 10 forms the next to the high speed driving connection for the transmission gearing. The middle circle of pins and the outer circle form with the pinion 16 the two lower speed driving connections, so that I am thus able to provide four speeds all within a compact transmission case. The pinion 16 is moved back and forth on the part 6 of the drive shaft by an operating means 18, which is within the control of the operator of the machine. This pinion 16 is capable of being moved into engagement with either circle of pins 14 and 15 and when moved into engagement with the pins 14, the pinion 10 will be moved out of engagement with the pins 13 to an inoperative position between these pins and the gear 7.

For the purpose of reversing the direction of movement of the driving mechanism, I provide a wide faced pinion 19 idly mounted on the drive shaft 5 and adapted to mesh with the pins 15 and also with a pinion 20 carried by a short shaft 21. A pinion 22 is mounted on a shaft 23 and meshes with the pinion 20 and is normally idle. A pinion 24 is mounted on the drive shaft and is connected with an operating rod 25, which has a sliding connection with the pinion 19 through a slot 26 and a pin 27. The movement of the rod 25 will slide the pinion 24 on its shaft into engagement with the pinion 22 and when the pin 27 has reached the end of the slot 26, the pinion 19 will be pushed into engagement with the pins 15. The power from the drive shaft will then be transmitted through the idle pinions to the differential mechanism to operate in a reverse direction from the movement of the shaft 5 and the pinion 24.

I claim as my invention:—

1. A transmission gearing, comprising a differential gear mechanism and shaft or axle sections connected therewith, a disk secured to said differential gear, a series of pins arranged in concentric circles in the face of said disk, a fixed gear centrally mounted with respect to said disk, a drive shaft parallel substantially with the plane of said disk, an idle gear thereon normally meshing with said fixed gear, and a series of pinions slidably mounted on said drive shaft, one of said pinions being adapted to engage said idle gear and temporarily lock it on said drive shaft, or move out of engagement with said idle gear and engage the pins of the inner circle on said disk, substantially as described.

2. A reversing mechanism for a transmission gearing, comprising in combination a differential gear mechanism, a disk connected therewith, a series of pins arranged in concentric circles in the face of said disk, a drive shaft, an idle pinion thereon, a second pinion also normally idle, two idle pinions journaled near said drive shaft and one of them normally meshing with the first-named drive shaft pinion, and means for simultaneously sliding said drive shaft pinions on said shaft to move one of them into engagement with one circle of pins on said disk, and the other drive shaft pinion into mesh with the second idle pinion, substantially as described.

3. In a transmission gearing, the combination, with a differential gear mechanism, of a disk secured thereto, and a series of pins concentrically mounted in the face of said disk, a drive shaft parallel with the plane of said disk, pinions slidably mounted on said drive shaft, one of said pinions being idle and the other turning with said shaft, means for moving said pinions lengthwise on said shaft and said other pinion into mesh with a circle of pins on said disk, and a normally idle driving connection between said pinions, whereby a reversal in the direction of movement of one pinion with respect to the movement of the other pinion will be obtained.

4. A transmission gearing, comprising a differential mechanism and a shaft connected therewith, a disk, a series of pins arranged in concentric circles in the face of said disk, a fixed gear centrally mounted with respect to said disk, a drive shaft parallel substantially with the plane of said disk, an idle gear thereon normally meshing the said fixed gear, a pinion slidably mounted on said drive shaft and adapted to engage said idle gear, and temporarily lock it on said drive shaft or to move out of engagement with said idle gear and engage the pins of one of the circles on said disk.

In witness whereof, I have hereunto set my hand this 5th day of April 1909.

ALBERT R. BEHNKE.

Witnesses:
J. A. BYINGTON,
C. G. HANSON.